Patented Aug. 15, 1939

2,169,364

UNITED STATES PATENT OFFICE 2,169,364

ACYLATED OLEFIN-SULPHUR DIOXIDE REACTION PRODUCTS

Carl S. Marvel, Urbana, Ill., and Donald S. Frederick, Moylan, Pa.; said Frederick assignor to said Marvel No Drawing. Application September 9, 1938, Serial No. 229,090

11 Claims. (Cl. 260—94)

This invention relates to acylated olefin-sulphur dioxide reaction products and is a continuation-in-part of applicants' copending application Serial No. 77,252, filed April 30, 1936, entitled "Reaction products of sulphur dioxide and olefins."

In said copending application Serial No. 77,252 is disclosed the preparation of reaction products of sulphur dioxide with a certain class of olefins as well as the acylation of said products. The claims in that application are directed to carrying out the preparation of the polysulphones in the presence of hydrogen peroxide.

Regardless of the manner in which the olefin-sulphur dioxide polymers are prepared, there is room for improvement in their stability, particularly at elevated temperatures, and an object of the present invention is to provide polysulphones which have been treated to improve their stability. A further object is to provide new compounds not heretofore known. A still further object is to provide a simple and economical method of preparing polysulphones of improved stability. Other objects will be apparent from the description of the invention given hereinafter.

The above objects are accomplished according to the present invention by treating a polymeric olefin-sulphur dioxide reaction product with an acylating agent in accordance with methods more fully explained below. The term "olefin" is used here in its commonly accepted meaning to denote mono-olefins.

It is now recognized that some olefins react with sulphur dioxide to a very limited extent or not at all but it will be understood that the present invention is not concerned with the selection of olefins which are proper for the production of the polymeric products employed as starting materials in the present invention. In other words, by the term "olefin-sulphur dioxide reaction product" as used herein is meant any such polymeric product, prepared in any way from any olefin which is capable of reacting with sulphur dioxide. Insofar as the applicability and practicability of the present process are concerned, the conditions of reaction and the nature of the olefin beyond its ability to react with sulphur dioxide, are immaterial. Thus, the method employed in preparing olefin-sulphur dioxide reaction products will greatly influence the physical state of the product obtained and its purity; also catalysts, diluents, and the like, will affect the speed and degree of reaction, the yield obtained, and the ease with which the products may be prepared. However, the resulting polysulphones, disregarding impurities, are all capable of acylation. With only rare exceptions, they are polymeric products in which the olefin and sulphur dioxide have combined in equimolecular proportions, though the extent of combination may vary widely. In other words, the present invention, namely, acylated olefin-sulphur dioxide polymers and their preparation, is applicable to a greater or less extent to all olefin polysulphones regardless of the olefin and regardless of the method of preparing the polymer.

The following examples are given to illustrate specific embodiments of the present invention. Throughout the specification and claims quantities are given by weight unless otherwise indicated:

*Example I.*—A cooled mixture consisting of 20 cc. of cyclohexene and 3 cc. of 2% aqueous hydrogen peroxide was mixed with 20 cc. of liquid sulphur dioxide, placed in a tightly stoppered heavy-walled flask and allowed to stand at room temperature (25°–30° C.) for about 24 hours. The flask was then cooled in a bath held at about −20° C. and opened. The viscous mass remaining in the flask was dissolved in 50 cc. of chloroform. The polymer obtained was then precipitated by adding a large volume (300 cc.) of diethyl ether to the solution. The polymer was collected on a Buchner funnel, sucked dry, and further purified by grinding in a mortar, washing with diethyl ether, filtering and drying.

Ten (10) grams of the cyclohexene-sulphur dioxide polymer thus obtained was dissolved in 40 cc. of acetyl chloride in the cold. The colorless solution thus obtained was poured very slowly into three liters of ice water. The solid precipitate was dried on a suction filter, washed thoroughly with water and then with ethyl alcohol and diethyl ether. The solid product was powdered and the washing was repeated. A yield of 9.5 grams was obtained. The acetylated product had the same solubility characteristics as the original polymer. It melted to a clear glass at 210–215° C. and did not discolor on standing or heating.

*Example II.*—Ten (10) grams of the cyclohexene-sulphur dioxide polymer prepared in Example I was dissolved in 40 cc. of chloro acetyl chloride and the reaction mixture was subsequently treated as in the acylating step of Example I. Nine-and-one-half (9½) grams of precipitated polymer was obtained. It had a melting range of 215–220° C. and had the same solubility characteristics as the original polymer.

*Example III.*—A mixture of one gram of sulphur dioxide-pentene polymer and 3 cc. of trichloroacetyl chloride was allowed to stand at about 25° C. for 24 hours. The mixture was then poured into water and filtered. Most of the trichloroacetic acid was removed from the solid product by grinding with ethyl alcohol, filtering, and repeating the process using diethyl ether instead of alcohol. The trichloroacetyl derivative was then re-precipitated from its solution in acetone, filtered, ground with ethyl alcohol, and washed with diethyl ether.

*Example IV.*—A pressure vessel, cooled in a solid carbon dioxide-acetone bath, was charged with 142 parts of a mixture of butene-1 and butene-2 (made by thermal dehydration of n-butyl alcohol), 167 parts of sulphur dioxide, and 1.4 parts of benzoyl peroxide dissolved in 27 parts of warm absolute alcohol. The vessel was sealed and allowed to stand at room temperature for four days. During this time a resin separated as a white, partly fused mass. The vessel was then opened and the volatile matter allowed to escape. The resin formed was purified by dissolving in about 1500 parts of chloroform, followed by precipitation with ether. After drying, the weight of white amorphous resin was 205 parts of 67% of the theoretical yield. The resin was soluble in acetone and dioxan as well as chloroform and the viscosity of a 10% solution of the resin in dioxan at 25° C. was 10.5 poises.

Ten (10) grams of the n-butylene polysulphone thus prepared were dissolved in 90 cc. of chloroform, then mixed with 20 grams of acetyl chloride and allowed to stand at room temperature overnight. The resin was precipitated by pouring the solution into a large volume of ether and dried. It weighed 8.9 grams. It was ground to pass an 80 mesh screen, agitated for three days' with an 80:20 methanol-acetone mixture, filtered and dried at 45° C. for one day. The resulting product, which was a white powder, was used in making moldings and heat stability tests as outlined at the end of Example V.

*Example V.*—Twenty-five (25) grams of n-butylene polysulphone made from the following ratio of ingredients:

Mixed 1- and 2-butenes____mols__ 1 (56 grams)
Sulphur dioxide_____mols__ 3–4
Benzoyl peroxide_____gram__ 1
Absolute ethanol_____cc__ 15 and purified by extraction with an 80:20 methanol-acetone mixture were dissolved in a mixture of 225 grams of chloroform and 10 grams of acetic anhydride. After the solution had been allowed to age at room temperature for 4 days the resin was precipitated, purified, and was used in making moldings and heat stability tests as outlined in the table below.

In the following table I refers to the acetylated polysulphone resin of Example IV, II refers to the same polysulphone before acylation used as a control, while III refers to the acylated polysulphone resin of Example V, and IV refers to that polysulphone resin before acylation used as a control.

| Acetylating agent | | Stability * of— | | Appearance of moldings— | |
|---|---|---|---|---|---|
| | | Powder | Molded resin | Before test | After test |
| I | Acetyl chloride | 1.35 | 0.76 | Water clear | Clear but contained bubbles. |
| II | (Control) | 1.79 | 0.795 | ____do____ | Opaque. |
| III | Acetic anhydride | _____ | 0.73 | ____do____ | Clear but contained bubbles. |
| IV | (Control) | 2.92 | 1.68 | ____do____ | Opaque. |

*Percent loss in weight when the sample was heated at 140° C. for 2 hours. Tests were made on quarter sections of ⅛ x 2″ poker chips.

Although the difference in the percent loss in weight during the stability test between the acylated products and the control samples is not great, it will be seen that the difference in the appearance of the moldings after the stability test is extreme, the moldings of the acylated resins remaining transparent while the moldings of the control samples became opaque, which is evidence of the increased stability of the acylated products.

It will be understood that the above examples are merely illustrative and that the present invention comprises the discovery that the olefin-sulphur dioxide polymers herein considered may be readily reacted with acylating agents and that the acylated derivatives, such as the acetates and haloacetates, are new and useful compounds which can be used for many of the purposes for which the untreated polymers are applicable and, furthermore, show greater stability than the untreated polymers.

In practicing the present invention, any olefin that reacts with sulphur dioxide may be used. Olefins which merit special mention are propene, pentene-2, 3-cyclohexylpropene-1, 2-methylpropene, pentene-1, nonene-1, cyclohexene, ethylene, 3-methylcyclohexene, octene-2, allyl alcohol, undecylenyl alcohol ($CH_2=CH.(CH_2)_8.CH_2OH$), octene-1, butene-1, butene-2, and mixtures of butene-1 and butene-2 such as obtained by thermal dehydration of n-butyl alcohol, and allyl ethyl ether.

So far as the present invention is concerned, the particular manner of preparing the polysulphone resin to be acylated is immaterial. As disclosed in said copending application Serial No. 77,252 and illustrated in Example I of the present specification, aqueous hydrogen peroxide may be used as the catalyst or, as illustrated in Example IV, benzoyl peroxide may be used as the catalyst. Aldehydes, such as paraldehyde, and other catalysts such as will occur to those skilled in the art may be used and, in fact, the sulphur dioxide may be reacted with the olefin in the complete absence of a catalyst although the reaction between the sulphur dioxide and many of the olefins in such case will be so slow as to be impractical. Also, the reaction may be carried out with the reactants exposed to ultra-violet light.

The acylation of these polysulphone resins may be readily carried out by dissolving the resin in the acylating agent or in mixtures of the acylating agent with an organic solvent for the resin. The conditions observed in the acylation of heretofore known compounds are, in general, applicable to the acylation of the herein considered polysulphone resins.

Any of the various classes of acylating agents such as the carboxylic acids, their anhydrides, or their acid halides may be used in this invention.

Among the acids suitable as acylating agents are: acetic acid, butyric acid, etc.

Among the acid anhydrides suitable as acylating agents are acetic anhydride, n-butyric anhydride, chloroacetic anhydride, benzoic anhydride, phthalic anhydride, etc.

Among the acid halides suitable as acylating agents are acetyl chloride, n-valeryl chloride, benzoyl chloride, chloroacetyl chloride, trichloroacetyl chloride, phthalyl chloride, hexahydrobenzoyl chloride, etc.

The acylated compounds of the present invention are generally adapted for uses to which the untreated polysulphone resins may be put. These acylated products, either alone or modified with natural resins, synthetic resins, cellulose derivatives, waxes, fillers, pigments, softeners, and plasticizers find use as molding compositions, particularly in the manufacture of low cost construction elements such as base boards, window frames, and elements for cabinet work. They are useful as coating compositions when dissolved in suitable solvents, either alone or in admixture with other materials of the type enumerated above. Such compositions may be used for coating all kinds of surfaces such as wood, metals, glass, textile fabrics, paper, stone, concrete, brick, plaster, and the like. The products, particularly those which are very high melting and insoluble in the usual paint, varnish, and lacquer solvents, are also useful as pigments and fillers.

The advantage of the present invention is that it provides with little additional cost new products which are more stable than untreated polysulphone resins. A particular advantage of the present invention is that it provides resins which, when subjected to such temperatures as are necessary in molding, will remain transparent whereas the unacylated corresponding polysulphone resin tends to become opaque under similar conditions.

Further, these resins possess (a) increased stability during milling and machining of the finished product, thus helping to eliminate objectionable sulphur dioxide odor as well as to give improved products, (b) increased stability during hot molding with similar advantages, and (c) increased stability upon aging of the molded products, thus aiding in the preventing of crazing, warping, shrinking, discoloration, embrittlement, and the like.

As many apparently widely different embodiments of this invention may be made without departing from the spirit and scope thereof, it is to be understood that the invention is not limited to the specific embodiments thereof except as defined in the appended claims.

We claim:

1. Process comprising treating a polysulphone resin obtained by reacting sulphur dioxide with an olefin, with an acylating agent.

2. Process comprising treating a polysulphone resin obtained by reacting sulphur dioxide with an olefin, with an acetylating agent.

3. Process comprising treating a polysulphone resin obtained by reacting sulphur dioxide with a butene, with an acylating agent.

4. Process comprising treating a polysulphone resin obtained by reacting sulphur dioxide with a mixture of 1- and 2-butenes, with an acylating agent.

5. Process comprising treating a polysulphone resin obtained by reacting sulphur dioxide with 1-butene, with an acylating agent.

6. Process comprising treating a polysulphone resin obtained by reacting sulphur dioxide with 2-butene, with an acylating agent.

7. Process comprising treating a polysulphone resin obtained by reacting sulphur dioxide with a mixture of 1- and 2-butenes, with an acylating agent from the group consisting of acetic anhydride and acetyl chloride.

8. Product of claim 1.
9. Product of claim 3.
10. Product of claim 5.
11. Product of claim 7.

CARL S. MARVEL.
DONALD S. FREDERICK.